United States Patent
Ammon et al.

[11] Patent Number: 5,924,780
[45] Date of Patent: Jul. 20, 1999

[54] SLIDING DOOR ASSEMBLY FOR A COMPUTER HOUSING

[75] Inventors: James G. Ammon, San Jose; Bradley Melmon, San Francisco, both of Calif.; Brian Boyce, Madison, Wis.; Simon Gatrall; Gregor Berkowitz, both of San Francisco, Calif.

[73] Assignee: Silicon Graphics, Inc., Mountain View, Calif.

[ * ] Notice: This patent issued on a continued prosecution application filed under 37 CFR 1.53(d), and is subject to the twenty year patent term provisions of 35 U.S.C. 154(a)(2).

[21] Appl. No.: 08/940,273

[22] Filed: Sep. 30, 1997

[51] Int. Cl.$^6$ ..................................................... A47B 96/00
[52] U.S. Cl. ......................... 312/223.2; 49/445; 312/306
[58] Field of Search ..................................... 312/306, 312, 312/319.1, 350, 223.2, 323, 322; 49/362, 418, 445; 361/727

[56] References Cited

U.S. PATENT DOCUMENTS

| | | | |
|---|---|---|---|
| 644,751 | 3/1900 | Yawman | 312/351 X |
| 670,929 | 4/1901 | Feder | 49/362 X |
| 2,120,327 | 6/1938 | Elsaesser | 49/445 X |
| 3,489,480 | 1/1970 | Slouka | 312/312 |
| 3,794,401 | 2/1974 | Dean et al. | 312/323 |
| 4,793,099 | 12/1988 | Friese et al. | 49/362 X |
| 5,026,130 | 6/1991 | Wright et al. | 312/323 |
| 5,169,218 | 12/1992 | Chu | 312/306 X |
| 5,171,075 | 12/1992 | Nagano et al. | 312/319.1 X |

*Primary Examiner*—Jose V. Chen
*Assistant Examiner*—Janet M. Wilkens
*Attorney, Agent, or Firm*—Wagner Murabito & Hao

[57] ABSTRACT

A door assembly which includes a door that slides open and closed to alternatively expose and cover components of a computer system. The door assembly includes a rack and pinion system that prevents racking of the door. The non-racking feature allows for the door to be wider than prior art doors such that more components may be easily accessed by a computer user. The door assembly also includes a spring assembly for automatically closing the door, a dampener for moderating the movement of the door, and a latching mechanism that holds the door open. In one embodiment the latch mechanism is a push-push latch and the spring of the spring assembly is a constant force spring.

11 Claims, 7 Drawing Sheets

SLIDING DOOR ASSEMBLY FOR A COMPUTER HOUSING

TECHNICAL FIELD

The present claimed invention relates to the field of computer housings. More specifically, the present claimed invention relates to an improved door assembly for attaching a door to a bezel of a housing of a computing device.

BACKGROUND ART

Prior art computer systems typically include a computer housing which includes a front panel which is commonly referred to as a bezel that attaches to a computer cover which encloses the top, rear, and sides of the chassis. A door attaches to the bezel so as to allow for access to certain components of the computer such as disk drives, tape drives, floppy drives, etc. The door protects the drives and other delicate hardware, but allows access to media in the drives (floppies, CD's, etc.). Prior art computer systems attach the door to the bezel using hinges such that the door swings to one side or the other when the door is opened. Other designs swing up or down to open and close.

With prior art computer systems which use swinging doors, when the computer system is located in an area with restricted space, often the door either cannot be opened or can only be partially opened. In addition, when the door is open the door is subject to damage. The user may brush against or press against the door so as to force the door past the fully open position. This may cause the door to break off. In addition, when the door is open, a user may attempt to move the computer. The movement of the computer may result in the door striking an object so as to break or damage the door.

Recently, computer manufacturers have incorporated door designs which slide open and closed so as to overcome the problems associated with swinging door designs. However, sliding doors often bind (also referred to as racking) on one side of the door or the other when the door is opened or closed. This is particularly true when the width of the door is large relative to the length of the door and when the door slides open and closed lengthwise. Thus, designs which use doors which are narrow in width perpendicular to the direction of travel of the door and have a greater length in the direction of travel are typically used. However, these are relatively small due to the physical constraints imposed by the non-racking requirement.

Computers are often placed on the floor. Thus, users must bend down or reach down to access the computer. In order to provide easy access to the various components of the computer the components to be accessed and the door must be located within the upper region of the computer to be easily accessible to a user. Typically, at a minimum, components are placed in the upper half of the computer so as to allow a user to easily reach the components. This imposes an additional design restraint which limits the size of the door. This design restraint, in combination with the requirement that doors must be narrower in width perpendicular to the direction of travel than in length in the direction of travel means that the size of the door must be relatively small. This is particularly true with respect to doors which travel up and down since the length needs to be less than one half of the height of the computer so as to allow a user to easily reach the components. This dictates that designs with sliding that slide up and down are so narrow that they cannot accommodate more than one removable media drive horizontally, in all but the tallest of computer designs. In these prior art designs, drives are typically stacked one on top of the other within the narrow region covered by the door due to the physical constraints imposed by the non-racking requirement and door location constraints.

Use of removable media has grown in popularity and numerous different types of removable media are currently being used in the industry. Thus, computer systems require a large enough space to accommodate multiple media types. In addition, many manufacturers of removable media, and in particular media which records data on magnetic tape, are manufacturing tape drives and removable media which do not conform to any common standard. Thus, in order to use media produced by different manufacturers, multiple tape drives are required. This increases the need for a larger space to accommodate removable media drives.

What is needed is a door assembly design which does not require a lot of space in the front and side of the computer in order to be opened. In particular, a door assembly design which includes a door which is easy to open and close and which does not bind is required. Also, a door assembly which is wide enough to cover a larger size area is required so that multiple drives may be easily accessed therethrough. The present invention provides an elegant solution that meets the above needs.

DISCLOSURE OF THE INVENTION

The present invention meets the above needs with a sliding door assembly that includes a door which slides so as to cover an opening in a bezel. Components which need to be accessed frequently are disposed within the chassis in the area exposed by the opening in the bezel. Thus, upon opening the door, a user has access to the components located within the opening.

A computer which includes a chassis covered by a computer housing is disclosed. The chassis is enclosed on the top, on the rear and on two sides by the computer cover, with the bezel enclosing the front. A door located in the bezel allows a user to access devices such as drives which require the insertion and removal of removable media such as disks, tapes, etc. The door also allows access to controls such as, for example, system displays, control switches, etc. The door is attached to the bezel such that the door slides up and down so as to either cover or expose the opening in the bezel.

When the door is in its uppermost position, the opening in the bezel is covered and the door is in the closed position. Upon sliding the door down such that the door is in the open position, the opening in the bezel is exposed, allowing access to the devices contained within the opening in the bezel.

A latching mechanism which includes a push-push latch is used to hold the door open. A spring assembly automatically closes the door upon the release of the push-push latch. The spring assembly closes the door by applying a force to the door so as to move the door upward when the door latch is released.

The door assembly includes a rack and pinion system for preventing the door from binding. Since the rack and pinion system prevents the door from binding, a door which is wider than prior art doors may be used. This allows for multiple components such as removable media drives to be installed side-by side horizontally, greatly increasing the number of components that may be easily accessed by a user.

The present invention allows for easy access to components of the computer and in particular to removable media.

Opening of the door simply requires that the user pull the door down until it latches. The user needs only push on the door to get the door to close. Thus, the sliding door assembly of the present invention is easy to open and close.

The sliding door mechanism is less susceptible to damage than prior art systems that include doors that open by swinging sideways since there is no protrusion of the door form the computer. The anti-racking feature of the present invention prevents the binding of the door as it is slid open and closed. Thus, the present invention provides a simple and elegant solution to the problems associated with prior art attachment mechanisms.

These and other objects and advantages of the present invention will no doubt become obvious to those of ordinary skill in the art after having read the following detailed description of the preferred embodiments which are illustrated in the various drawing figures.

BRIEF DESCRIPTION OF THE DRAWINGS

The accompanying drawings, which are incorporated in and form a part of this specification, illustrate embodiments of the invention and, together with the description, serve to explain the principles of the invention.

BEST MODE FOR CARRYING OUT THE INVENTION

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one of ordinary skill in the art that the present invention may be practiced without these specific details. In other instances, well known methods, procedures, components, and circuits have not been described in detail as not to unnecessarily obscure aspects of the present invention.

Figure 1:
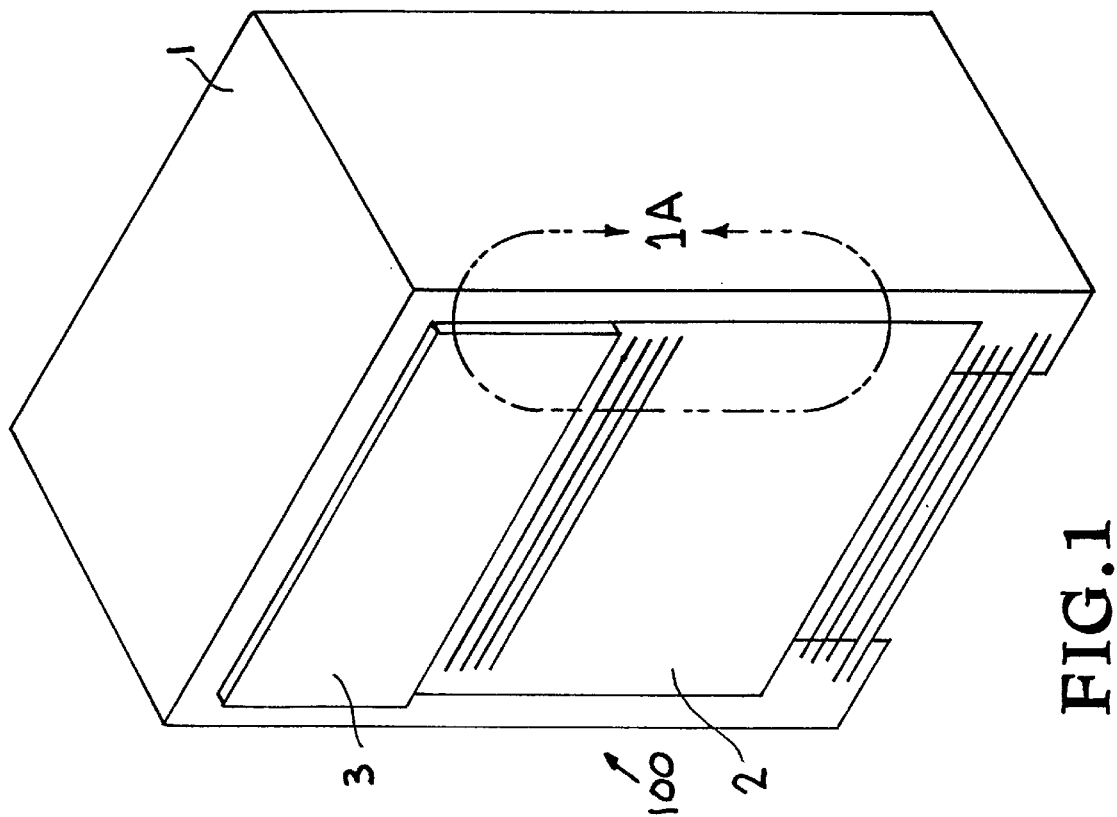
FIG. 1 is a front perspective view of a computer having a door which is closed in accordance with the present invention.

With reference now to FIG. 1, computer 100 is shown to include a housing that includes cover 1 which encloses the top, the bottom, and three sides of computer 100. The housing also includes bezel 2 which encloses the front of Computer 100. Door 3 is shown to be in the closed position. With door 3 in the closed position, the internal components of computer 100 are protected by cover 1, bezel 2, and door 3.

Figure 1A:
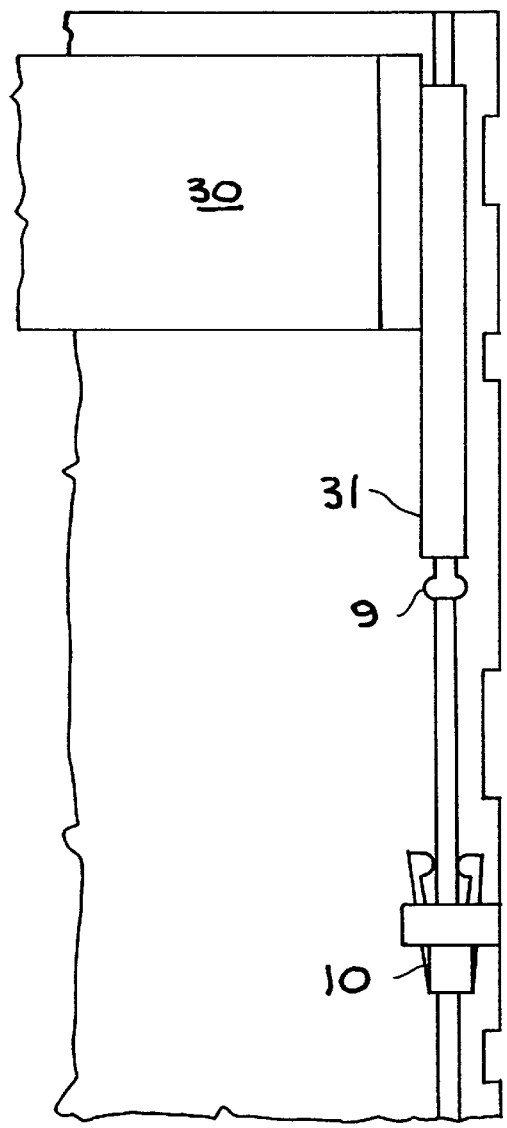
FIG. 1A is an expanded cut-away view of region 1A of FIG. 1 in accordance with the present invention.

The detail shown in FIG. 1A shows door 3 to include a manufacturing detail 9 which is adapted to be received by latching mechanism 10. In one embodiment, latch 10 is push-push latch which includes a latching mechanism for receiving detail 9. In one embodiment, a push-push latch such as the E 54010110 made by SOUTHCO of Concordville, is used. Alternatively, any of a number of known latching mechanisms could be used to hold door 3.

Figure 2:
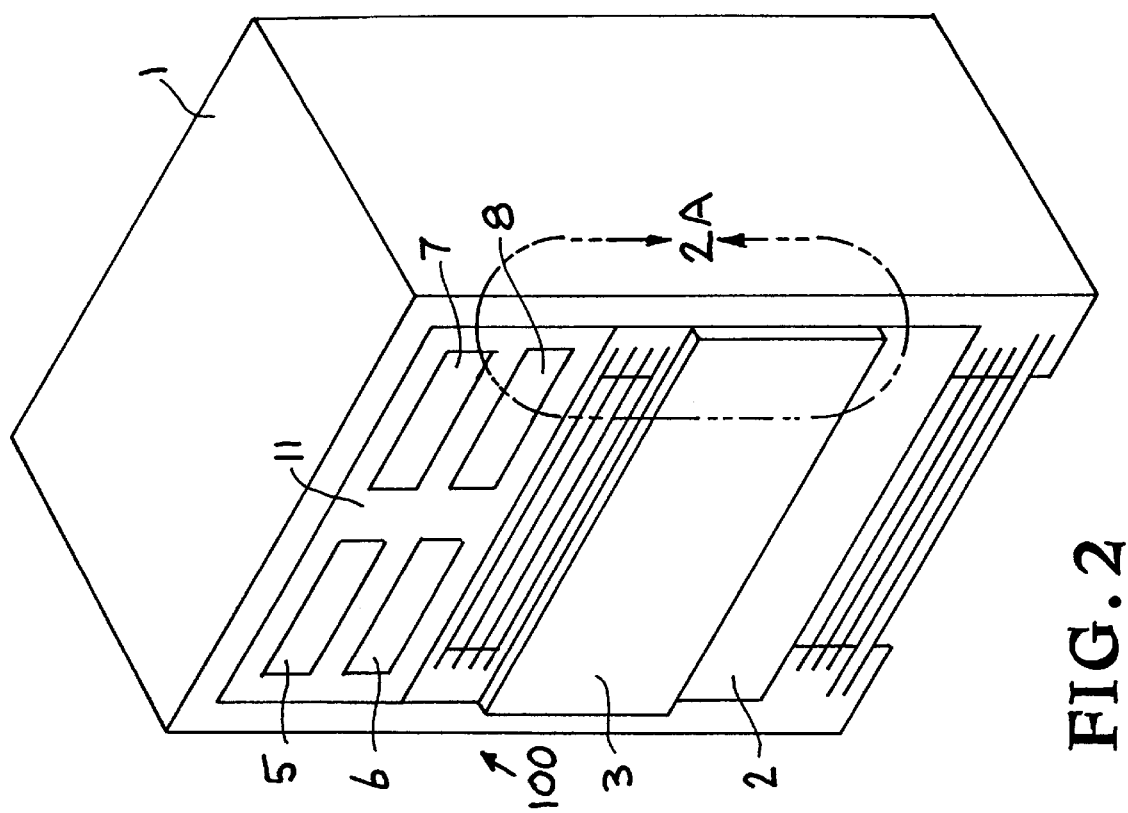
FIG. 2 is a front perspective view of a computer having a door which is open in accordance with the present invention.

FIG. 2 shows computer 100 after door 3 is moved downward into the open position. The movement of door 3 into the open position exposes a portion of chassis 11. Chassis 11 houses the internal components of computer 100. Computer 100 includes electronic circuits for data input and output, data storage and data processing. Drive 5, drive 6, drive 7, and drive 8 are attached to chassis 11 and are electrically connected with the other electronic circuits of computer 100. Drives 5–8 are exposed when door 3 is in the open position so as to allow for easy access to drives 5–8. Drives 5–8 could be floppy disk drives, CD ROM drives, read/write disk drives, tape drives or any of a number of other accessories or components to which the user may need to access on a regular basis. In one embodiment, bezel 2 and cover 1 are made of injection molded plastic and bezel 2 is secured to cover 1 by a latching mechanism (not shown).

Figure 2A:
FIG. 2A is an expanded cut-away view of region 2A of FIG. 2 in accordance with the present invention.

The detail shown in FIG. 2A illustrates how the latching mechanism of push-push latch 10 receives and holds door 3 by engaging detail 9. When push-push latch 10 engages detail 9, the door is held in the open position until the latching mechanism is released by pushing on door 3.

Continuing with FIG. 2, the placement of drives 5–8 behind door 3 allows a user to close door 3 during normal operation of computer 100. Thus, the user does not have to continually look at drives 5–8 which are not used all of the time. Door 3 also serves to protect drives 5–8 from damage and from environmental elements such as dust, moisture, and foreign matter spilled or dropped on the computer. However, since door 3 is easy to open, a user may readily gain access to drives 5–8 by opening door 3.

As can be seen in FIG. 2, door 3 is long enough to accommodate multiple drives horizontally. In fact, door 3 has a length which is only slightly less than the width of bezel 2 such that a large area of chassis 11 is exposed when door 3 is in the open position. In addition, the area exposed when door 3 is in the open position is in the upper portion of the front of computer 100 so as to allow for easy access to drives 5–8.

Figure 3:
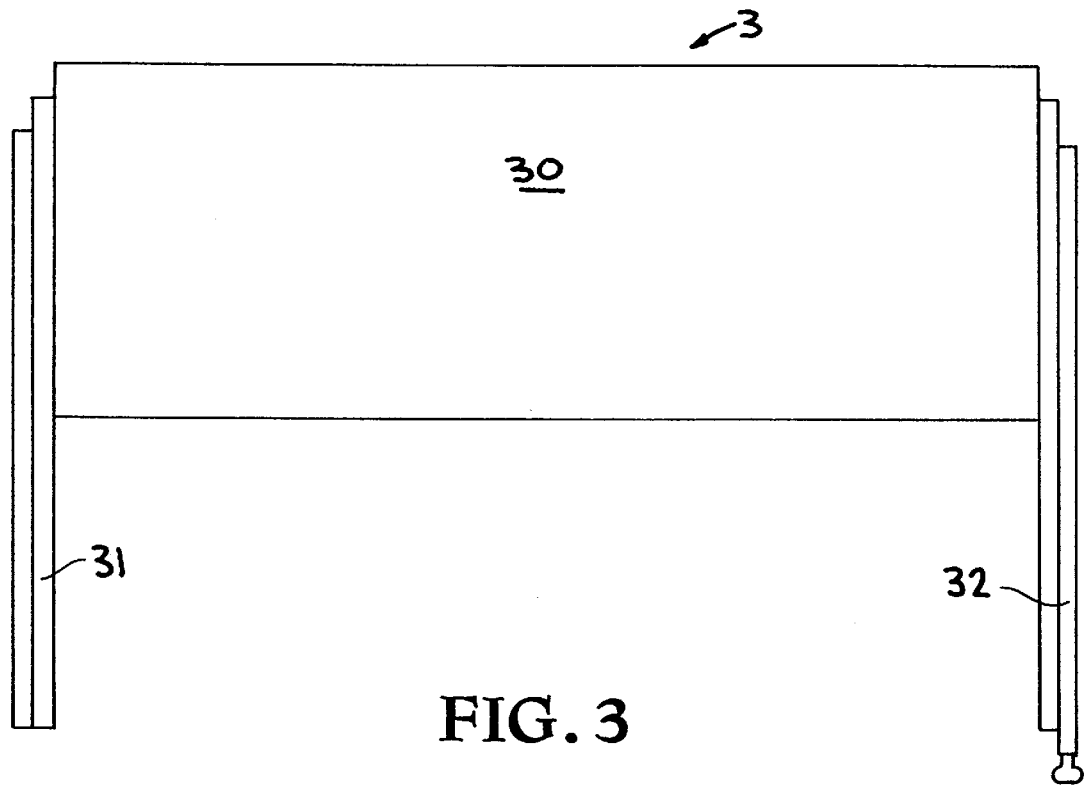
FIG. 3 is a front view of a door in accordance with the present invention.

FIG. 3 shows a front view of door 3 after door 3 is removed from computer 100. Door 3 includes door face 30 and rail 31 which extends from one side of door face 30 and rail 32 which extends from the opposite side of door face 30.

Figure 4:
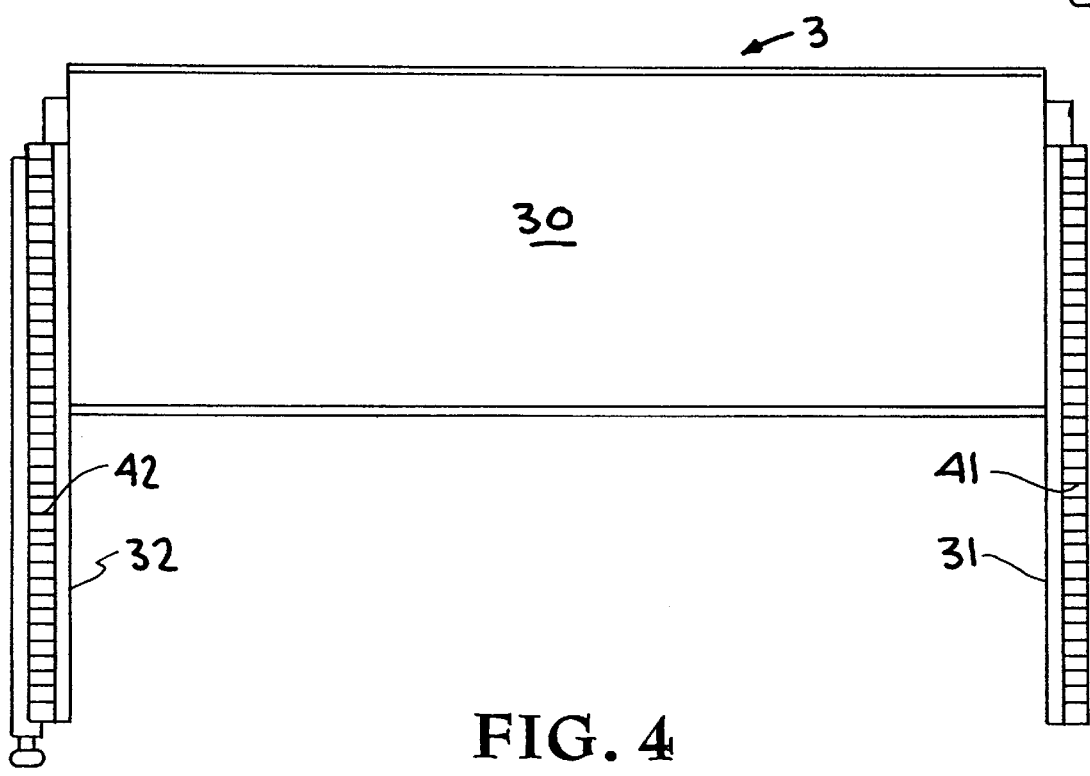
FIG. 4 is rear view of a door in accordance with the present invention.

The rear side of door 3 of FIG. 4 shows rail 31 to have rack 41 molded into it. Similarly, rack 42 is molded into rail 32. Rack 41 and rack 42 include teeth which extend along the length of each of racks 41 and 42. Although racks 41–42 are integrally molded into door 3, alternatively racks 41–42 could be separately manufactured and attached to rails 31–32.

Figure 5:
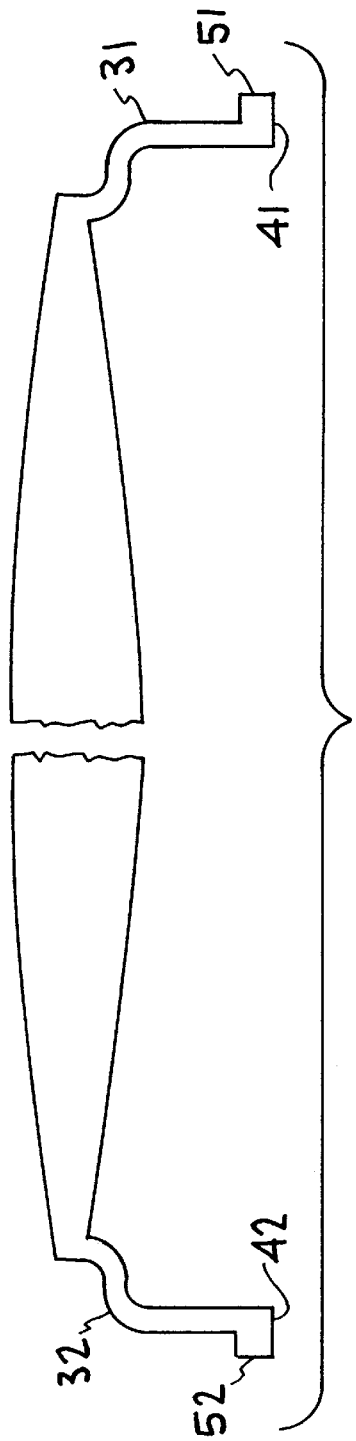
FIG. 5 is top view of a door in accordance with the present invention.

FIG. 5 shows a top view of door 3. Rail 31 is shown to include lateral extension 51 which runs along most of the length of rail 31. Similarly, rail 32 is shown to include lateral extension 52 which runs along most of the length of rail 32.

Figure 6:
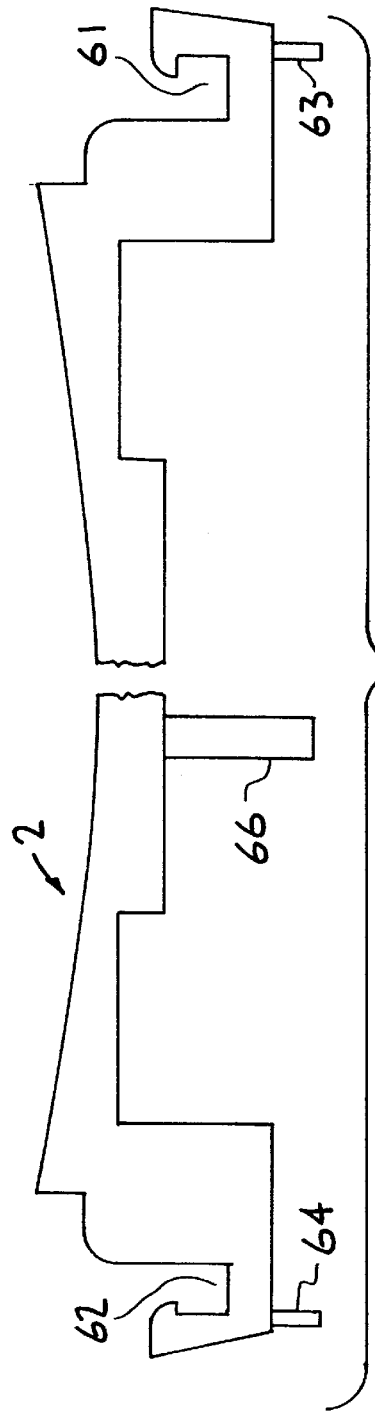
FIG. 6 is a top view of a bezel in accordance with the present invention.

FIG. 6 shows bezel 2 to include groove 61 which runs vertically along one side of bezel 2 and groove 62 which runs vertically along the opposite side of bezel 2. Groove 61 is shaped so as to receive lateral extension 51 shown in FIG. 5 and groove 62 of FIG. 6 is shaped so as to receive lateral extension 52 shown in FIG. 5. Tab 63 extends from one side of bezel 2 and tab 64 extends from the other side of bezel 2 such that tab 63 and tab 64 directly oppose each other horizontally. Rod guide 66 is disposed between tab 63 and tab 64 and is located in the same horizontal plane as are tabs 63–64.

Figure 7:
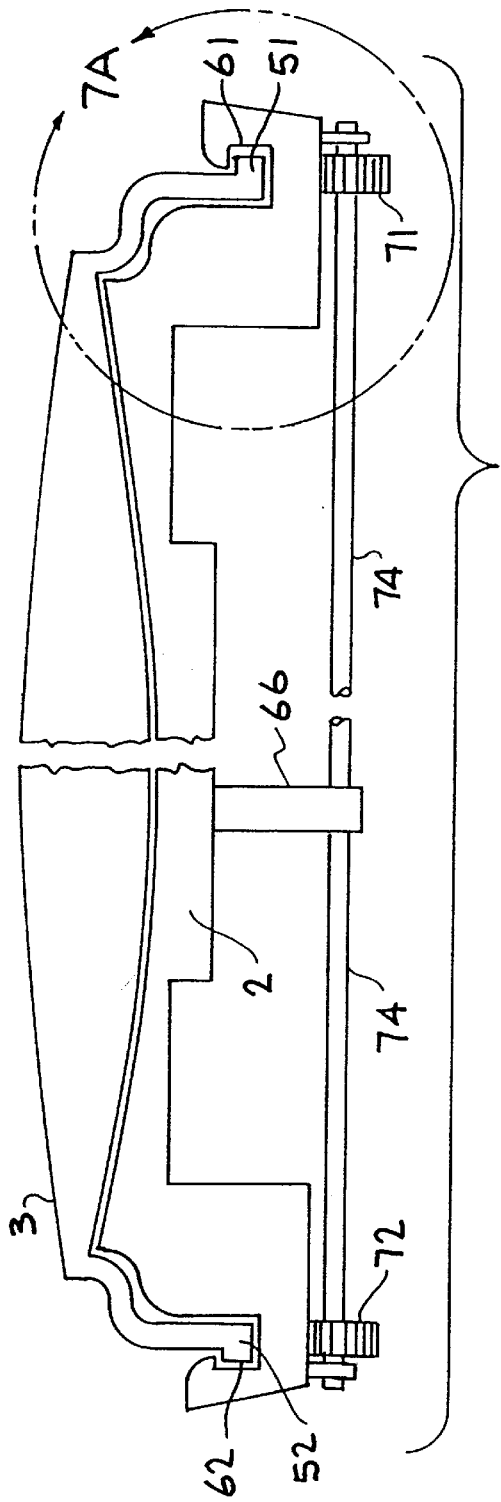
FIG. 7 is a top view of a door assembly installed into a bezel in accordance with the present invention.

FIG. 7 shows a top view of door assembly 70 which includes door 3 which is attached to bezel 2. Lateral extension 51 fits within groove 61 and lateral extension 52 fits within groove 62 so as to secure door 3 to bezel 2 such that door 3 may slide along the length of grooves 61–62. Door assembly 70 also includes rod 74 and pinions 71–72. Pinion 71 is attached to one end of rod 74 and pinion 72 is attached to the opposite end of rod 74. Pinions 71–72 are attached to rod 74 securely such that they do not rotate independently of rod 74.

Figure 7A:
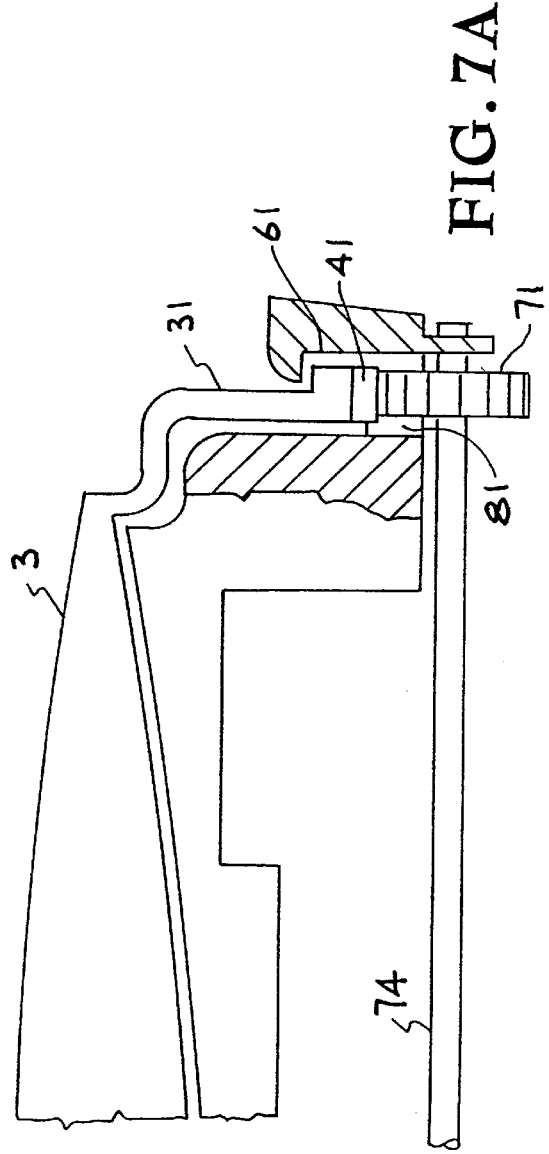
FIG. 7A is a top expanded cut-away view of region 7A of FIG. 7 in accordance with the present invention.

The detail shown in FIG. 7A illustrates how rack 41 engages pinion 71 such that the movement of door 3 rotates pinion 72.

Figure 8:
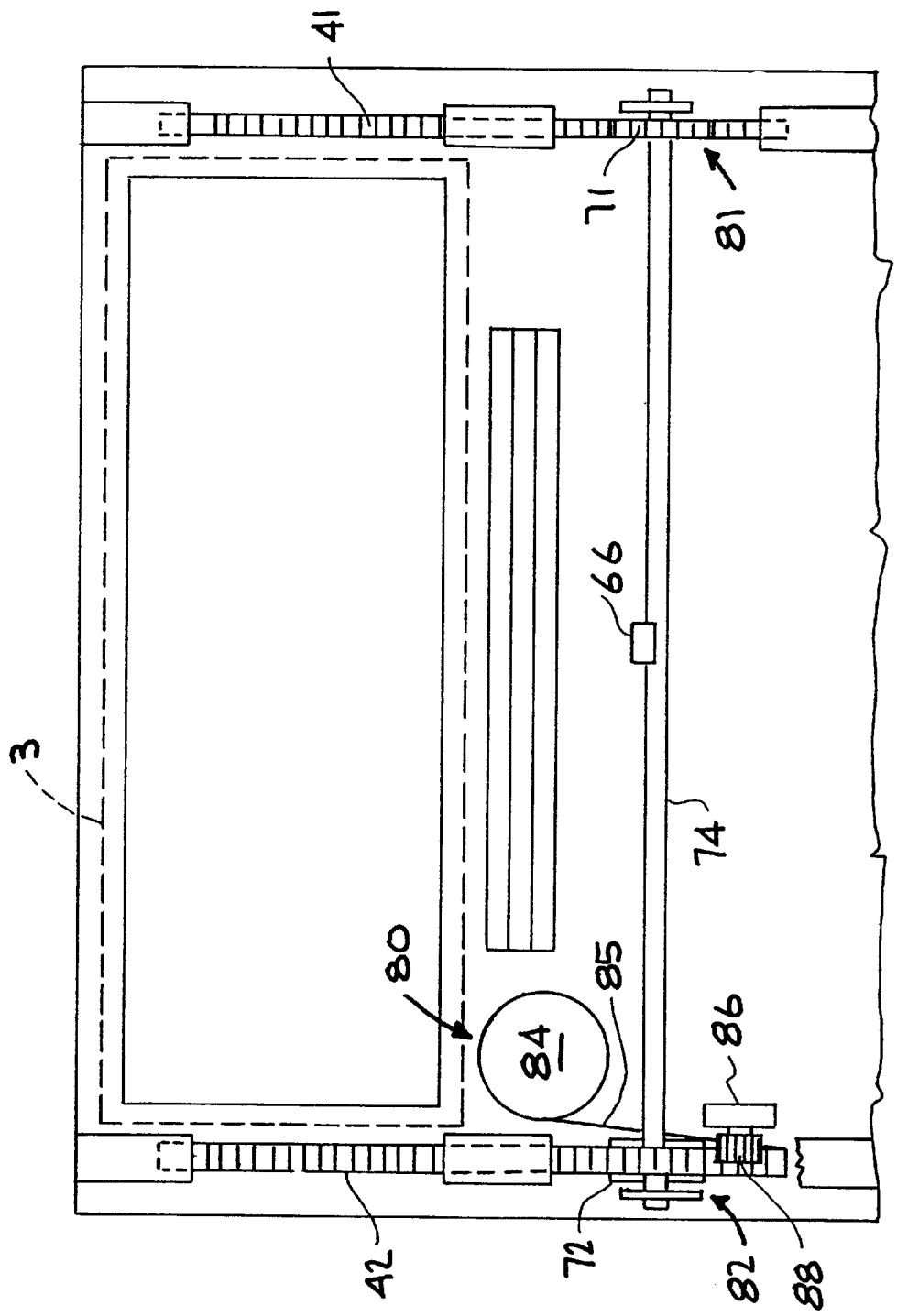
FIG. 8 is a rear view of a door assembly installed into a bezel in accordance with the present invention.

With reference now to FIG. 8, bezel 2 includes opening 81 which exposes a portion of rack 41 and opening 82 which exposes a portion of rack 42. Door assembly 70 also includes dampener 86. Dampener 86 includes pinion 88 which rotates and a dampening mechanism for controlling the rotation of pinion 88. Dampener 86 is attached to bezel 2 such that the teeth of pinion 88 engage the teeth of rack 42. The dampening mechanism of dampener 86 moderates the movement of door 3 as it slides up and down. Though any of a number of different types of dampeners could be used, in one embodiment, dampener 86 is a 2G54KC99950 dampener manufactured by NIFCO, INC. of Japan.

Continuing with FIG. 8, the teeth of pinion 72 engage the teeth of rack 42 and the teeth of pinion 71 engage the teeth of rack 41 such that rod 74 and pinions 71–72 rotate as door 3 is moved up and down. Pinion 71 and pinion 72 are forced to rotate in unison since they are securely attached together via rod 74. Since pinion 71 engages rack 41 and pinion 72 engages rack 42, racks 41–42 are forced to move in unison. By forcing racks 41–42 to move in unison, binding due to uneven movement (racking) is prevented. In one embodiment, pinions 71–72 are made of plastic.

Spring assembly 80 of FIG. 8 includes spool 84 which receives spring 85 such that spring 85 may be extended and retracted. Spring 85 attaches to the bottom end of rail 32 and applies an upward force to rail 32. Although any of a number of different constant force springs could be used, in one embodiment, spring 85 is a constant force spring manufactured by SANDVIK of Scranton, Pa. The force applied by spring assembly 80 of FIG. 8 forces door 3 upward such that door 3 remains in the closed position.

When a user desires to open door 3 of FIG. 8, the user needs only to press downward on door 3 so as to move door 3 into the open position. In the open position, manufacturing detail 9 engages latch 10 shown in FIGS. 1A and 2A so as to lock the door into the open position as is shown in FIGS. 2 and 2A. In the open position, the user has easy access to drives 5–8 of FIG. 2.

Door 3 of FIG. 8 is easily closed by applying a slight downward pressure to door 3 such that latch 10 of FIG. 1A and 2A is disengaged. This frees door 3 such that the force applied by spring assembly 80 moves door 3 upward into the closed position as is shown in FIGS. 1–1A. The force applied by spring 85 holds door 3 in the closed position. During the upward travel of door 3, dampening mechanism 86 prevents door 3 from moving too rapidly.

Door assembly 70 of FIG. 8 is shown to use spring assembly 80 which is a constant force spring assembly. Spring 85 is a constant force spring. Spring assembly 80 which is made by coiling a flat strip of metal around spool 84 which is allowed to rotate about it's center.

Although the door assembly of the present invention could operate without dampening mechanism 86 of FIG. 8, door 3 would bang as it is reaches the closed position and/or move too rapidly at the start of the closing operation. Though a spring that is weak enough to prevent such banging could be used, the movement would be too slow, particularly at the end of the door's movement. By using a door assembly which includes a dampener, a spring assembly 80 which has a force strong enough to quickly close door 3 and which is strong enough to hold door 3 in the closed position can be used without excessively fast movement of door 3 as it first starts to close and without unnecessary noise and jarring as door 3 moves into the closed position.

Spring assembly 80 of FIG. 8 is shown to use a constant force spring. However, alternatively, a standard compression spring could be used. However, since the force applied by a standard compression spring is not as uniform as the force applied by a uniform force compression spring, door 3 will move quickly at the beginning of the closing process and slowly at the end of the closing process, or it will tend to bang against the bezel at the end of the closing process, even though the movement is moderated by dampener assembly 86.

Figure 9:
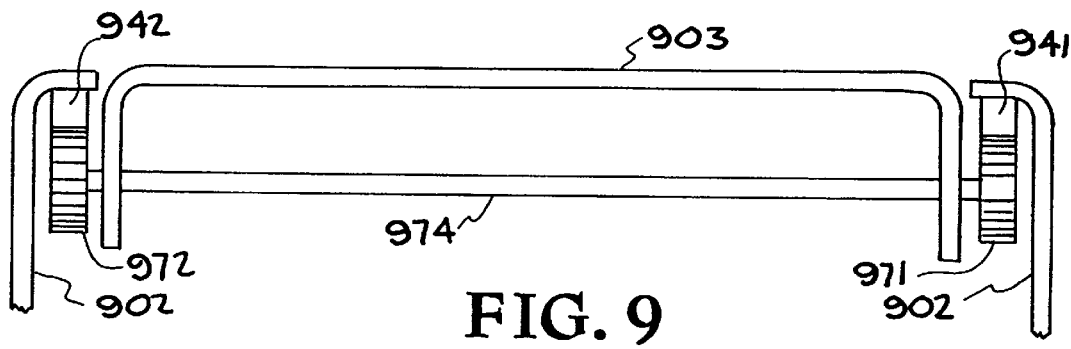
FIG. 9 is a top view of a second embodiment which includes a door assembly in which the pinions are attached to the door in accordance with the present invention.

FIG. 9 shows a second embodiment of the present invention in which rod 974 and spindles 971–972 are attached to door 903. Rod 974 is attached via openings in door 903 such that rod 974 freely rotates with respect to door 903. In this embodiment, racks 941–942 are molded into bezel 902. The embodiment shown in FIG. 9 includes a constant force spring assembly (not shown) and a dampener (not shown) which may be the same as dampener 86 and spring assembly 80 shown in FIG. 8 for closing door 903. In addition, a push-push mechanism (not shown) is used to hold door 903 in the closed position which may be the same as push-push mechanism 10 shown in FIGS. 1A and 2A.

Figure 10:
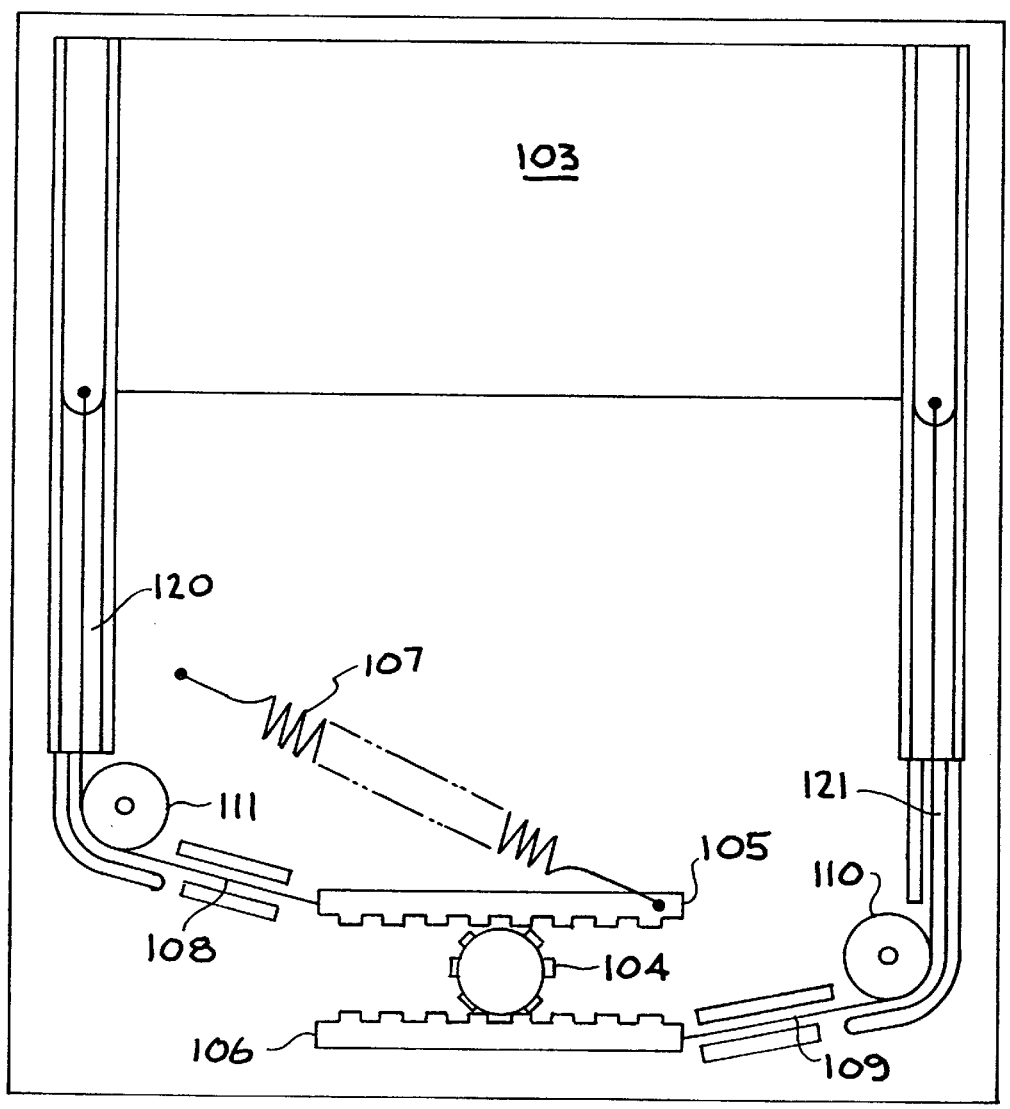
FIG. 10 is a rear view of a third embodiment which includes a door assembly in which a single pinion is disposed between opposing racks in accordance with the present invention.

FIG. 10 shows a third embodiment of the present invention in which spindle 104 is disposed between rack 105 and rack 106 such that rack 105 and rack 106 move in opposite directions as spindle 104 rotates. Metal strip 108 is attached to rack 105 and to door 103. Similarly, metal strip 109 is attached to rack 106 and to door 103. Metal strips 108 and 109 are made of a durable, moderately flexible metal strip which is sufficiently stiff so as to apply force to door 103. Metal strips 108 and 109 are constrained by channels 120 and 121. Wheels 110 and 111 rotate about their center so as to facilitate the movement of metal strips 108–109. Metal strip 108 extends through channel 120 and around wheel 111 such that movement of rack 105 applies an upwards force on door 103 such that door 103 automatically closes as a result of the force applied by spring 107 when door 103 is released. As rack 105 moves, pinion 104 translates the movement to rack 106. The movement of rack 106 applies a force to metal strip 109 which is applied to door 103 by the movement of metal strip 109 around wheel 110 and through channel 121. In this embodiment, racks 105–106 are constrained within channels (not shown) molded into bezel 902 so as to allow them to move horizontally within a limited range. In one embodiment spring 107 is an extension spring. Alternatively, a spring assembly that applies a constant force such as constant force spring assembly 80 of FIG. 8 could be used. The embodiment shown in FIG. 10 includes a push-push mechanism (not shown) which engages door 103 so as to holds door 103 in the closed position.

Though the door assembly of the present invention is described in FIGS. 1–10 as moving in an upward direction to close and moving downward to open, a door that opens upward and closes by downward movement could also be used. In addition, the door assembly of the present invention is described with reference to automatically closing upon release of the latching mechanism, the door could be designed to automatically open upon release of the latching mechanism.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

We claim:

1. An enclosure for a computer comprising;
   a computer housing having an opening formed therein;
   a door coupled to said computer housing such that said door moves relative to said computer housing, said door including a first rack and a second rack;
   a first pinion coupled to said computer housing and engaging said first rack;
   a second pinion coupled to said first pinion such that said second pinion rotates with the rotation of said first pinion, said second pinion engaging said second rack; and
   a spring assembly coupled to said computer housing and to said door for biasing said door to a closed position.

2. The enclosure for a computer of claim 1 further comprising a dampener, said dampener attached to said computer housing and including a pinion for engaging one of said first rack and said second rack, said dampener moderating the movement of said door.

3. The enclosure for a computer of claim 1 wherein said spring assembly further comprises a constant force spring.

4. The enclosure for a computer of claim 3 wherein said spring assembly further comprises a spool, said spool attached to said computer housing such that said spool may rotate, and said constant force spring wound around said spool such that said spool rotates so as to allow for the extension of said constant force spring.

5. The enclosure for a computer of claim 1 wherein said door is disposed within said computer housing such that said door opens by moving said door downward and said door closes automatically by moving upward into a closed position.

6. The enclosure for a computer of claim 5 further comprising a latching mechanism, said latching mechanism capable of being engaged so as to hold said door in an open position until such time that said latching mechanism is disengaged.

7. The enclosure for a computer of claim 6 wherein said door may be opened by pushing down on said door until said latching mechanism is engaged, said latching mechanism holding said door in the open position until such time that said latching mechanism is disengaged whereupon said latching mechanism releases said door.

8. The enclosure for a computer of claim 7 wherein said latching mechanism comprises a push-push mechanism.

9. The enclosure for a computer of claim 1 wherein said first pinion and said second pinion comprise plastic and wherein said first pinion is connected to said second pinion by a rod.

10. An enclosure for a computer comprising;
    a computer housing having an opening formed therein;
    a door coupled to said computer housing and adapted to move with respect to said computer housing;
    a first rack disposed within said computer housing such that said first rack may move within a limited range;
    a second rack disposed within said computer housing such that said second rack may move within a limited range;
    a pinion disposed between said first rack and said second rack such that said pinion rotates with the movement of said first rack and said second rack;
    a first metal strip for coupling said first rack to said door;
    a second metal strip for coupling said second rack to said door; and
    a spring assembly coupled to said computer housing and coupled to said first rack for biasing said door in a closed position.

11. The enclosure for a computer of claim 10 wherein said spring assembly includes an extension spring.

* * * * *